Sept. 8, 1942.  J. J. KELLY  2,295,176
VEHICLE SIGNAL LIGHT
Filed April 9, 1941   2 Sheets-Sheet 1

Inventor
JOSEPH JOHN KELLY

By Clarence A. O'Brien
Attorney

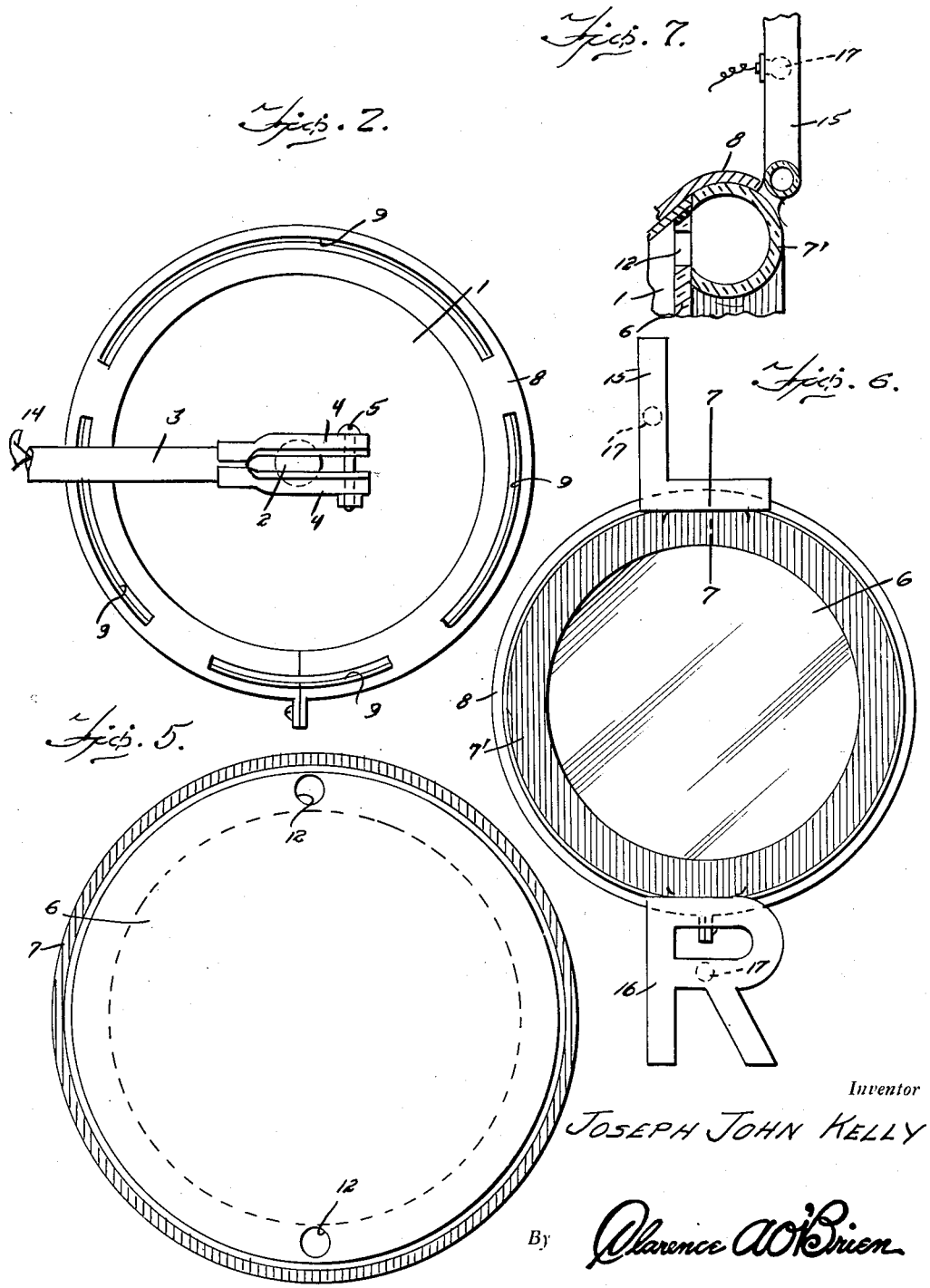

Patented Sept. 8, 1942

2,295,176

UNITED STATES PATENT OFFICE 2,295,176

VEHICLE SIGNAL LIGHT

Joseph John Kelly, Midland, Tex., assignor of forty per cent to Raymond T. Kelly, Carpinteria, Calif.

Application April 9, 1941, Serial No. 387,759

2 Claims. (Cl. 177—329)

The present invention relates to new and useful improvements in signals for motor vehicles and has for its primary object to provide, in a manner as hereinafter set forth, novel means whereby the operator of a vehicle may clearly indicate to the drivers of following vehicles that he contemplates stopping, slowing down, turning, etc.

Another very important object of the invention is to provide a signal of the aforementioned character comprising a novel combination and arrangement of rear view mirror and colored light whereby the operator may simultaneously see a following vehicle and observe that the light is functioning.

Other objects of the invention are to provide a motor vehicle signal light of the character described which will be comparatively simple in construction, strong, durable, highly efficient and reliable in use, compact, light in weight, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a view in rear elevation thereof.

Figure 5 is a view in rear elevation of the mirror and the protruding outer portion of the red illuminated annular tube which is mounted on the front of said mirror.

Figure 6 is a view in front elevation of a modification.

Figure 7 is a vertical sectional view, taken substantially on the line 7—7 of Figure 6.

Figure 1:
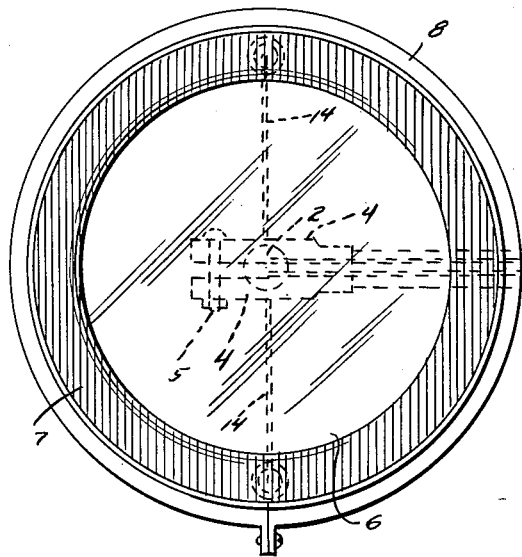
Figure 1 is a view in front elevation of a motor vehicle signal constructed in accordance with the present invention.
Figure 4:
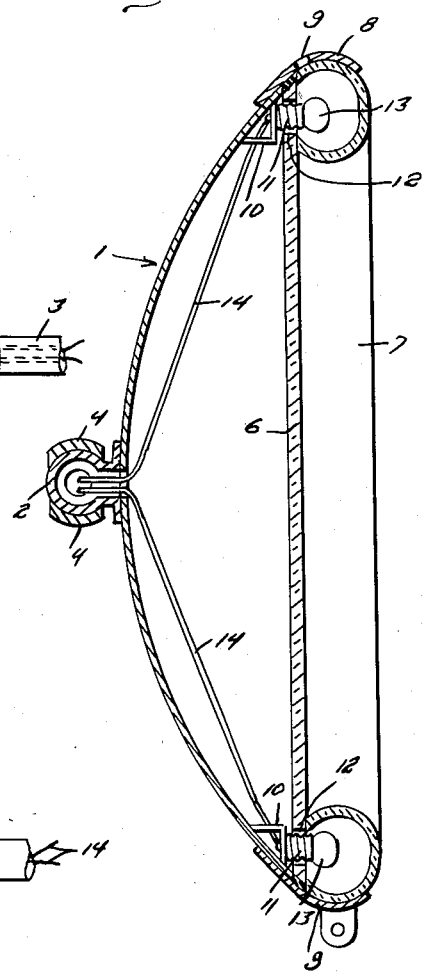
Figure 4 is a view in vertical section through the device.
Figure 3:
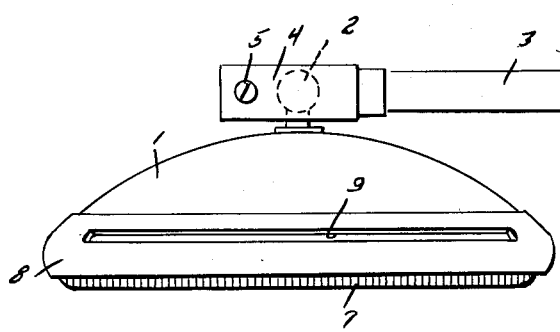
Figure 3 is a plan view.

Referring now to the drawings in detail, it will be seen that reference numeral 1 designates a concavo-convex casing which may be of any suitable dimensions and material. Fixed on the back of the casing 1 and communiacting with the interior thereof is a centrally located hollow apertured ball 2. The casing 1 is adapted to be mounted at any desired location on a motor vehicle by means including a tubular arm 3. Fixed on the outer end portion of the arm 3 and projecting longitudinally therefrom are resilient, co-acting jaws 4 of arcuate cross section which are adapted to receive the ball 2 therebetween. A bolt 5 is provided in the free end portions of the jaws 4 for clamping said jaws on the ball 2 in a manner to frictionally secure the casing 1 in adjusted position.

Mounted on the open front of the casing 1 is a mirror 6. Cemented or otherwise suitably secured on the marginal portions of the front of the mirror 6 is an annular red tube 7 of substantially segmental cross section. The tube 7 is of glass or other suitable material and it will be observed that the outer portion of said tube protrudes beyond the periphery of the mirror 6. A split clamping ring 8 of suitable metal firmly secures the tube 7 and the mirror 6 in position on the casing 1. The clamping ring 8 has formed therein circumferentially extending light emitting slots 9. The light emitting slots 9 are visible when the device is viewed from the rear, as seen in Figure 2 of the drawings.

Mounted on suitable brackets 10 in the casing 1 adjacent the periphery of the mirror 6 are electric sockets 11. The sockets 11 protrude into the tube 7 through openings 12 which are provided therefor in the mirror 6. Electric lamps 13 are mounted in the sockets 11 for brilliantly illuminating the tube 7. As many of the lamps 13 as desired may be provided. Conductor wires 14 electrically connect the lamps 13 with the usual electric system of the motor vehicle, said conductor wires passing through the casing 1, the hollow ball 2, the tubular arm 3, etc.

It is thought that the operation of the device will be readily apparent from a consideration of the foregoing. Briefly, when the electric lamps 13 are energized the red tube 7 is brilliantly illuminated in a manner to immediately attract thereto the attention of the drivers of following vehicles. Any suitable switch means may be provided for controlling the electric lamps 13. By looking in the mirror 6 the operator of the vehicle may conveniently ascertain if there is another vehicle behind him. Further, the mirror 6 reflects and diffuses the red light from the tube 7 thereby materially enhancing the brilliance of the signal.

In the modification illustrated in Figures 6 and 7 of the drawings, transparent tubular letters 15 and 16 are fused or otherwise secured on the upper and lower portions of the tube 7'. Mounted in the tubular, transparent letters 15 and 16 are electric lamps 17. Of course, the electric lamps 17 are to be wired to the usual electric system of the motor vehicle. Any suitable switch means may be provided for selectively controlling the lamps in the letters 15 and 16. It will be noted that the members 15 and 16 are the letters "L" and "R," respectively. The letter "L" is illuminated to indicate that a left turn is contemplated and the letter "R" is illuminated when a right turn is to be made. Other means such as oppositely pointing arrows or hands, may be substituted for these letters.

It is believed that the many advantages of a motor vehicle signal light constructed in accordance with the present invention will be readily understood and although preferred embodiments of the device are as illustrated and described, it is to be understood that further modifications and changes in the details of construction may be resorted to which will fall within the scope of the invention as claimed.

What is claimed is:

1. A signal of the class described comprising a mirror having holes passing through its edge portion, a colored tube of transparent material fastened directly to the front face of the mirror at the edge portion thereof with the tube extending entirely around the mirror, that portion of the tube contacting the mirror having an opening therein communicating with the holes with the edge walls of the opening fastened to the mirror, and electric lamps in the tube and having portions passing through the holes.

2. A signal of the class described comprising a mirror having holes passing through its edge portion, a colored tube of transparent material fastened directly to the front face of the mirror at the edge portion thereof with the tube extending entirely around the mirror, that portion of the tube contacting the mirror having an opening therein communicating with the holes with the edge walls of the opening fastened to the mirror, electric lamps in the tube and having portions passing through the holes, a casing having its front open with the mirror and tube located in the front portion with a part of the casing having slots therein for the passage of light from the tube.

JOSEPH JOHN KELLY.